Nov. 24, 1942.  W. O. BAER ET AL  2,302,659
POWER GENERATING SYSTEM
Filed May 29, 1941
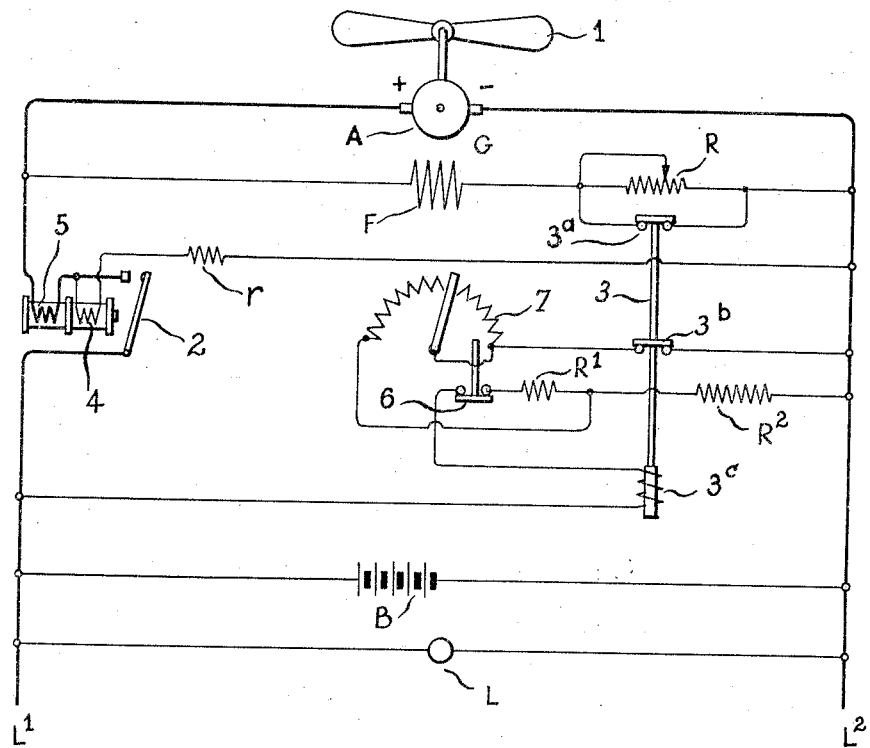
Inventors
Walter O. Baer
Paisley B. Harwood
By Frank H. Hubbard
Attorney Patented Nov. 24, 1942

2,302,659

UNITED STATES PATENT OFFICE 2,302,659

POWER GENERATING SYSTEM

Walter O. Baer, Milwaukee, and Paisley B. Harwood, Wauwatosa, Wis., assignors to Cutler-Hammer, Inc., Milwaukee, Wis., a corporation of Delaware Application May 29, 1941, Serial No. 395,720

2 Claims. (Cl. 171—314)

This invention relates to power generating systems, and while not limited thereto is particularly applicable to systems in which a wind driven generator is employed for battery charging.

The invention has among its objects to provide a new and novel power generating system of the aforesaid character which is exceedingly efficient and reliable in operation and which insures against injury to the battery during charging thereof.

Another object is to provide a system of the aforesaid character having improved automatic regulating means associated therewith for governing the output of the generator to provide for charging of the battery at a selected high rate until the same becomes fully charged and for thereafter reducing the output of the generator to provide for charging of the battery at a selected low finishing rate.

Another object is to provide a system of the aforesaid character in which automatic control of the output of the generator is effected by means of a single voltage responsive relay.

Various other objects and advantages of the invention will hereinafter appear.

The accompanying drawing diagrammatically illustrates an embodiment of the invention which will now be described, it being understood that the embodiment illustrated is susceptible of modification without departing from the spirit and scope of the appended claims.

Referring to the drawing, the same illustrates a power generating system including a generator G having an armature A and a shunt field winding F. Armature A is driven by a prime mover such as a windwheel I and field winding F has an adjustable regulating resistance R connected in series therewith. The generator is adapted to supply current to lines $L^1$, $L^2$ through the medium of an automatic switch 2 to charge a storage battery B which is connected across said lines in parallel with a load circuit indicated by reference character L. The system also includes a voltage relay 3 which acts as hereinafter set forth to automatically regulate the output of the generator.

More specifically switch 2 is biased toward open position and is controlled by a pair of operating windings 4 and 5. Winding 4 is permanently connected across the terminals of generator G in series with a resistance $r$ and said winding acts to effect closure of switch 2 when the generator operates at a predetermined speed sufficiently high to effect charging of battery B.

Upon closure of switch 2 a charging circuit for battery B is established from the positive terminal of generator G through winding 5 to line $L^1$ and said winding then acts to assist winding 4 in maintaining said switch in closed position. However, when the voltage of generator G drops below the voltage of battery B the direction of current in winding 5 is reversed and said winding then acts in opposition to winding 4 to open switch 2, and thereby prevent discharge of the battery through the generator.

Voltage relay 3 is provided with normally closed contacts $3^a$ for shunting field regulating resistance R and the same is also provided with normally closed contacts $3^b$ and an operating winding $3^c$. Winding $3^c$ has one terminal connected to line $L^1$ and the other terminal thereof is normally connected to line $L^2$ in series with resistances $R^1$ and $R^2$ by a normally closed switch 6 associated with an adjustable rheostat 7. Rheostat 7 is normally connected in shunt with resistance $R^2$ by the contacts $3^b$ of voltage relay 3 and switch 6 is arranged to be opened when said rheostat is set to include all of the resistance thereof in shunt with resistance $R^2$.

The operation of the aforedescribed system is as follows: The contacts $3^a$ of voltage relay 3 are normally in closed position to short-circuit field regulating resistance R for full field strength of the generator and consequently when the generator starts operating its voltage will build up rapidly and at a predetermined speed of the generator switch 2 closes as hereinbefore set forth to establish a charging circuit for battery B extending from the positive terminal of the generator to line $L^1$. As will now be set forth, the contacts $3^a$ of relay 3 are maintained in closed position to shunt field regulating resistance R for full output of the generator until the voltage across the terminals of battery B exceeds a selected value determined by the setting of rheostat 7.

As hereinbefore set forth, the operating winding $3^c$ of relay 3 is normally connected across lines $L^1$, $L^2$ in series with resistances $R^1$ and $R^2$ by rheostat switch 6 and the adjustable rheostat 7 is normally connected in shunt with resistance $R^2$ by the relay contacts $3^b$. The operating winding $3^c$ is thus connected across the terminals of battery B to provide for response of relay 3 when the battery voltage is of a selected value determined by the setting of rheostat 7. As is apparent, adjustment of rheostat 7 to increase the amount of resistance included in shunt with resistance $R^2$ increases the voltage value at which relay 3 is adapted to respond and adjustment of said rheostat to decrease the amount of resistance included in shunt with resistance $R^2$ has an opposite effect.

As is well known, the potential of a storage battery increases as the same becomes charged, and in the case of a lead battery a potential slightly in excess of 2.5 v. per cell is reached when the battery becomes fully charged. As the battery voltage rises the voltage impressed upon winding $3^c$ of relay 3 will rise accordingly and when said winding is subjected to a selected voltage determined by the setting of rheostat 7 relay 3 responds and the contacts $3^a$ thereof open to include field regulating resistance R in circuit with field winding F to thereby reduce the output of the generator. Upon response of relay 3 the contacts $3^b$ thereof open to exclude rheostat 7 from the energizing circuit of winding $3^c$ and said winding is then maintained energized through the medium of switch 6 and resistances $R^1$ and $R^2$. Resistances $R^1$ and $R^2$ are so calibrated that winding $3^c$ is rendered effective to prevent return of relay 3 to closed position until battery B is discharged to reduce the terminal voltage thereof to a predetermined value.

When battery B is fully charged rheostat 7 should be set to exclude all of the resistance thereof. Relay 3 is then adapted to respond at a relatively low voltage value and if said relay is in open position when switch 2 is closed the same closes almost immediately to insert resistance R in the field circuit of the generator for charging of the battery B at a low rate.

When it is desired to give the battery an overcharge, rheostat 7 is set to include all of the resistance thereof and switch 6 is then maintained in open position to disconnect the operating winding $3^c$ of relay 3 from line $L^2$. Relay 3 is thus rendered inoperative and the contacts $3^a$ thereof shunt resistance R to provide for charging of the battery by the full output current of generator G.

What we claim as new and desire to secure by Letters Patent is:

1. In a power generating system, in combination, a storage battery, a generator for charging the same, a relay for controlling the field strength of said generator, said relay being normally positioned to provide for full field strength of said generator and being movable out of normal position under the action of an operating coil connected across the terminals of said battery to reduce the field strength of said generator, a plurality of resistances connected in the energizing circuit of said coil, one of said resistances being adjustable and being normally connected in shunt with another of said resistances to provide for response of said relay under the action of said coil at a selected voltage across the terminals of said battery which is determined by the setting of said adjustable resistance, and means associated with said relay for excluding said adjustable resistance from the energizing circuit of said coil to provide for dropping out of said relay at a predetermined voltage across the terminals of said battery determined by the value of the other of said resistances.

2. In a power generating system, in combination, a storage battery, a generator for charging the same, a relay for controlling the field strength of said generator, said relay being normally positioned to provide for full field strength of said generator and being movable out of normal position under the action of an operating coil connected across the terminals of said battery to reduce the field strength of said generator, a plurality of resistances connected in the energizing circuit of said coil, one of said resistances being adjustable and being normally connected in shunt with another of said resistances to provide for response of said relay under the action of said coil at a selected voltage across the terminals of said battery which is determined by the setting of said adjustable resistance, means associated with said relay for excluding said adjustable resistance from the energizing circuit of said coil to provide for dropping out of said relay at a predetermined voltage across the terminals of said battery determined by the value of the other of said resistances, and means for interrupting the energizing circuit of said coil to insure against response of said relay upon setting of said adjustable resistance in a predetermined position.

WALTER O. BAER.
PAISLEY B. HARWOOD.